US006251836B1

(12) United States Patent
Duncum et al.

(10) Patent No.: US 6,251,836 B1
(45) Date of Patent: *Jun. 26, 2001

(54) HYDRATE INHIBITION

(75) Inventors: Simon Neil Duncum, Bracknell; Antony Roland Edwards, Beverley; Keith James, Banstead; Christopher George Osborne, Sandhurst, all of (GB)

(73) Assignee: BP Exploration Operating Company Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 08/913,568

(22) PCT Filed: Mar. 14, 1996

(86) PCT No.: PCT/GB96/00591

§ 371 Date: Nov. 18, 1997

§ 102(e) Date: Nov. 18, 1997

(87) PCT Pub. No.: WO96/29501

PCT Pub. Date: Sep. 26, 1996

(30) Foreign Application Priority Data

Mar. 23, 1995 (GB) .................................................. 9505864

(51) Int. Cl.$^7$ ................................ C09K 3/00; C09K 7/06; C07C 9/00
(52) U.S. Cl. ............................. 507/90; 507/123; 585/15; 585/950
(58) Field of Search .................... 507/90, 123; 585/15, 585/950

(56) References Cited

U.S. PATENT DOCUMENTS

| | | | |
|---|---|---|---|
| H1749 | * 9/1998 | Colle et al. | 585/15 |
| 5,420,370 | * 5/1995 | Sloan, Jr. | 585/15 |
| 5,432,292 | * 7/1995 | Sloan, Jr. | 507/90 |
| 5,460,728 | * 10/1995 | Klomp et al. | 585/15 |
| 5,639,925 | * 6/1997 | Sloan et al. | 585/15 |
| 5,648,575 | * 7/1997 | Klomp et al. | 585/15 |

* cited by examiner

*Primary Examiner*—Philip Tucker
(74) *Attorney, Agent, or Firm*—Fay, Sharpe, Fagan, Minnich & McKee, LLP

(57) ABSTRACT

A hydrate inhibitor comprising a blend of an additive (i) and at least one of an additive (ii) and an additive (iii) wherein additive (i) is a polymer of an ethylenically unsaturated N-heterocyclic carbonyl compound, with 6–8 ring atoms in the heterocyclic ring, additive (ii) is a corrosion inhibitor and additive (iii) is a salt of formula (I):$[R^1(R^2)XR^3]^+Y^-$ $1/v$, I wherein each of $R^1$, $R^2$ and $R^3$ is bonded directly to X, each of $R^1$ and $R^2$, which may be the same or different is an alkyl group of at least 4 carbons, X is S, $NR^4$ or $PR^4$, wherein each of $R^3$ and $R^4$ which may be the same or different represents hydrogen or an organic group, with the proviso that at least one of $R^3$ and $R^4$ is an organic group of at least 4 carbons, especially at least 5 carbons, and Y is an anion of valency v, wherein v is an integer of 1–4.

16 Claims, No Drawings

HYDRATE INHIBITION

The present invention relates to hydrate inhibitors and a method for inhibiting the formation of hydrates in particular to a method for inhibiting the formation of hydrates in the petroleum and natural gas industries.

Hydrates are formed of two components, water and certain gas molecules, e.g. alkanes of 1–4 carbons, especially methane and ethane, such as those found in natural gas. These 'gas' hydrates will form under certain conditions, i.e. when the water is in the presence of the gas and when the conditions of high pressure and low temperature reach respective threshold values. The gas may be in the free state or dissolved in a liquid state, for example, as a liquid hydrocarbon.

The formation of such hydrates can cause problems in the petroleum oil and natural gas industries.

Hydrate formation in the field may cause blocked pipelines, valves and other process equipment.

The problem is particularly of concern as natural gas and gas condensate resources are discovered where operating conditions surpass these threshold values, i.e. in deep cold water and on-shore in colder climates.

Hydrates can also form in association with the underground hydrocarbon reservoir thus impeding production by blockage of reservoir pores.

The problem of hydrate formation is however commonest during gas transportation and processing, the solid hydrate precipitating from moist gas mixtures. This is particularly true with natural gas which when extracted from the well is normally saturated with water. Often in such a case, in a cold climate, hydrates will form in downstream transportation networks and this can cause large pressure drops throughout the system and reduce or stop the flow of natural gas.

Hydrate formation may also occur during natural gas cryogenic liquefaction and separation.

A typical situation where hydrate formation can occur is in off shore operations where produced fluids are transported in a long vertical pipeline, for example, a riser system. Such produced fluids normally include light gases known to form hydrates and water. In such a situation a temperature of 4.5° C. and a pressure of 150 psi would be sufficient for hydrate formation.

Several methods are known to prevent hydrate formation and subsequent problems in pipelines, valves and other processing equipment.

Physical methods have been used, e.g. increasing gas temperature in the pipeline, drying the gas before introduction into the pipeline, or lowering the gas pressure in the system. However, these techniques are either expensive or are undesirable because of loss of efficiency and production.

Chemical procedures have also been used. Electrolytes, for example, ammonia, aqueous sodium chloride, brines and aqueous sugar solutions may be added to the system.

Alternatively, the addition of methanol or other polar organic substances, for example, ethylene glycol or other glycols may be used. Methanol injection has been widely used to inhibit hydrate formation. However, it is only effective if a sufficiently high concentration is present since at low concentrations there is the problem of facilitation of hydrate formation. Also for methanol to be used economically under cold environmental conditions there must be early separation and expulsion of free water from the well in order to minimise methanol losses in the water phase.

We have now found certain additives which may be used as effective hydrate inhibitors at low concentrations.

The present invention provides a blend comprising Additive (i) which is a polymer of (a) an ethylenically unsaturated N-heterocyclic carbonyl compound, with 6–8 ring atoms in the heterocyclic ring and optionally (b) a different ethylenically unsaturated N-heterocyclic carbonyl compound with 5–7 ring atoms in the heterring, the numbers of heteroring atoms in (a) and (b) differing by at least one, and at least 1 of Additives (ii) a corrosion inhibitor and (iii) a salt which is of formula $[R^1(R^2)XR^3]^+Y^-1/v$, 1 wherein each of $R^1$, $R^2$ and $R^3$ is bonded directly to X, each of $R^1$ and $R^2$, which may be the same or different is an alkyl group of at least 4 carbons, X is S, $NR^4$ or $PR^4$, wherein each of $R^3$ and $R^4$ which may be the same or different represents hydrogen or an organic group, with the proviso that at least one of $R^3$ and $R^4$ is an organic group of at least 4 carbons, especially at least 5 carbons, and Y is an anion of valency v, wherein v is an integer of 14 e.g. 1 or 2.

The present invention also provides a method of inhibiting or retarding hydrate formation and/or growth, which method comprises adding a blend of the invention in amount effective to inhibit or retard hydrate formation to a medium susceptible to hydrate formation.

The Additive (i) is a Polymer of (a) and optionally (b), each being ethylenically unsaturated N-heterocyclic carbonyl compounds. The weight proportions of structural units from (a) to (b) may be 100:0 or 100–40:0–60, such as 100–60:0–40 or preferably 100–85:0–15, preferred proportions are 100:0, 50:50 and 75:25. The Polymer has a hydrocarbon chain with pendant N-heterocyclic carbonyl groups, with the bonding to the chain preferably via the heterring -N- atom.

The polymer may be made by polymerisation of (a) or simple copolymerisation of (a) and (b) or may be a graft copolymer, e.g. from grafting (b) onto homopolymeric (a). Each N-heterocyclic carbonyl compound may contain 1 or more than 1 e.g. 2 or 3 heterocyclic rings, but each case it contains at least 1 ring containing the specified number of ring atoms. That N heterocyclic ring may contain 1–3 ring N atoms but especially I ring N atom and 0–2 other ring hetero atoms e.g. 0 or S, but especially no extra ring hetero atom. The ring or rings may be saturated or ethylenically unsaturated. The carbonyl group may be in any position in the N heterring, but is especially alpha to the N hetero atom, so the N-heterocyclic rings are preferably derived from lactams, such as those derived from butyric, pentenoic, pentanoic or hexanoic acid lactams (or 2-pyrrolidone, 2-pyridone, 2-piperidone or omega caprolactam). The polymer may have structural units from N-vinyl omega caprolactam (and be a homopolymer) or may also have structural units from N-vinyl pyrrolidone.

The polymer preferably consists essentially of structural units derived from (a) e.g. homopoly caprolactam or consists essentially of structural units from (a) and only ethylenically unsaturated N-heterocyclic compounds especially (b); structural units from polar ethylenically unsaturated non cyclic compounds (especially from esters of an alcohol containing more than I polar group and an unsaturated acid) and/or ethylenically unsaturated carbocyclic carbonyl compounds are preferably substantially absent.

Preferably the Polymer is water soluble or water dispersible, e.g. to an extent of at least 0.01% by weight in water such as at least 0.05% but especially at least 0.5%, such as up to 10% by weight. Its molecular weight is usually 5,000 to 1,000,000 e.g. 10,000 to 1,000,000 such as 1,000 to 50,000 or 50,000–500,000 and preferably has a K value of 10–150 especially 15–50, wherein the K value is obtained from the relative viscosity in aqueous solution via the FIKENTSCHER'S Formula, from which the average molecular weight is calculated as described in U.S. Pat. No. 2,811,499.

The polymers may be as described in WO 94/12761, the disclosure of which is herein incorporated by reference.

The blend of the invention also comprises at least one of Additive (ii) the Corrosion Inhibitor and (iii) the salt of formula I. The blends may comprise both (ii) and (iii), or may comprise (ii) in the substantial absence of (ii) or (iii) in the absence of more than 2% of (ii) (based on the combined weight of Additives (i) and (iii), preferably in the substantial absence of (ii).

The Additive (ii) is a corrosion inhibitor eg. for steel and usually one suitable for use in anaerobic environments. It may be a film former, capable of being deposited as a film on a metal eg. a steel surface such as a pipeline wall. It preferably has surfactant activity and especially surface wetting activity.

It is especially a nitrogenous compound with 1 or 2 nitrogen atoms. The corrosion inhibitor may be a primary, secondary or tertiary amine, or a quaternary ammonium salt, usually in all cases with at least one hydrophobic group, usually a benzene ring or a long chain alkyl group eg. of 8–24 carbons. It may be a quaternary ammonium salt, a long chain aliphatic hydrocarbyl N-heterocyclic compound or a long chain amine. The quaternary salt may be an (optionally alkyl substituted) benzyl trialkyl ammonium halide, in particular when at least 1 and especially 1 or 2 alkyl groups is of 1–20, in particular 8–20 carbons such as cetyl and the other alkyl groups are of 1–6 carbons such as methyl or ethyl; examples are benzyl alkyldimethyl ammonium chloride and Benzalkonium chlorides e.g. mixtures of benzyl alkyl dimethyl ammonium chlorides especially wherein each alkyl has 8–20 carbons, in particular 8–18 or 12–18 carbons.

Other quaternary ammonium salts may be of formula $[R^5R^6NR^7R^8]^+Z^-$ 1/w, wherein Z is an anion eg. a halide or sulphate and w is an integer of 1–4 e.g. 1 or 2, $R^5$ is an alkyl or alkenyl group of at least 8 carbons, $R^6$ is an alkyl or alkenyl group, each of at least 2 carbons or a N- heterocyclic group, and $R^7$ and $R^8$, which may be the same or different represents an alkyl group, with the proviso that at least one of $R^6$–$R^8$ has less than 4 carbon atoms. $R^5$ may be of 8–24 carbons, such as 10–18 carbons, especially, dodecyl, lauryl, cetyl, palmityl, stearyl or oleyl, while $R^6$ may be selected from the same groups as $R^5$, or may be ethyl, propyl, isopropyl, butyl or hexyl. $R^7$ and $R^8$ may be selected from the same groups as $R^6$ but preferably represent methyl groups. Examples of these quaternary salts are cetyl trimethyl ammonium, dodecyl trimethylammonium and lauryl trimethylammonium halides, eg. chlorides or bromides.

Other quaternary salt corrosion inhibitors are of formula $[R^9NR^{10}R^{11}]^{3\oplus}$ $Z^-$ 1/w where Z is a anion eg. as defined above and w is an integer of 14 e.g. 1 or 2, $R^9N$ or $R^9NR^{10}$ forms a quaternizable N heterocyclic ring, and $R^{11}$ represents an alkyl or alkenyl group each of at least 8 carbons eg. as described for $R^5$. The $R^9N$ group may be N- heterocyclic group with 1 or 2 ring N atoms, especially with 1 or 2 heterocyclic rings, eg. of 5 or particularly 6 ring atoms; examples of the rings are saturated ones eg. piperidine. The group $R^9NR^{10}$ may also be such an N heterocyclic group but with the $R^9$ and $R^{10}$ groups combined with the N atom to which they are bonded to form an unsaturated ring or fused N bridged ring system such as a pyridine ring. $R^{10}$ if present may otherwise be an alkyl or alkenyl group eg. as described for $R^8$. Examples of these quaternaries are cetyl pyridinium halides, such as the chloride.

The corrosion inhibitor may also be a long chain aliphatic hydrocarbyl N-heterocyclic compound, which is not quaternised. The aliphatic hydrocarbyl group in the heterocyclic compound usually has 8–24 carbons in the hydrocarbyl group, preferably a linear saturated or mono or diethylenically unsaturated hydrocarbyl group; cetyl-, stearyl and especially oleyl- groups are preferred. The N-heterocyclic compound usually has 1–3 ring N atoms, especially 1 or 2 which usually has 5–7 ring atoms in each of 1 or 2 rings; imidazole and imidazoline rings are preferred. The heterocyclic compound may have the aliphatic hydrocarbyl group on an N or preferably C atom in the ring; the ring may also have an amino-alkyl (e.g. 2-amino ethyl) or hydroxyalkyl (e.g. 2-hydroxyethyl) substituent, especially on an N atom. N-2-aminoethyl-2-oleyl-imidazoline is preferred. The long chain amine usually contains 8–24 carbons and preferably is an aliphatic primary amine, which is especially saturated or mono ethylenically unsaturated; an example is dodecylamine. Mixtures of any of the above corrosion inhibitors with each other may be used, eg a quaternary ammonium salt and a long chain aliphatic hydrocarbyl-N-heterocyclic compound (where each is preferably as described above), or mixtures with a tertiary aliphatic amine.

If desired the corrosion inhibitor eg. a long chain amine may also comprise a phosphate ester salt, especially one with surface wetting activity. Such phosphate esters are anionic surfactants, which are salts of alkali metals eg. sodium or a quatemray ammonium eg. tetra methyl ammonium or tetrabutyl ammonium salts of acid phosphate esters, eg. with 1 or 2 organic groups and 2 or 1 hydrogen atoms; examples of the organic groups are alkyl or alkenyl groups as described for $R^5$ above. Examples of such phosphate ester salts are mono and dioctyl acid phosphate salts and mixtures thereof. A preferred blend comprises a long chain alkylarine and a phosphate ester salt eg. as sold as NAL 1272 by Nalco. Other corrosion inhibitors include blends of a phosphate ester salt and an inorganic salt, usually with water and a glycol ether e.g. butyl diglycol ether such as is sold by BP Chemicals under Trade Mark C795.

Additive (iii) is a salt of formula I, $[R^1R^2XR^3]^+Y^-$ 1/v in which each of $R^1$ and $R^2$ is an alkyl group of at least 4 carbons, which may be a linear alkyl or branched alkyl group, eg. a secondary or tertiary alkyl group or especially an isoalkyl group. Each of $R^1$ and $R^2$ may be an alkyl group of 4–24 carbons, preferably 4–10 and especially 4–6 carbons, such as n-butyl, isobutyl, secbutyl, tertiary butyl, n-pentyl, sec pentyl, isopentyl or tertiary pentyl group, or hexyl group. $R^3$ and $R^4$ (if present as is preferred) are each hydrogen or an organic group eg. of 1–24 carbons such as an alkyl or alkenyl group each preferably of 8–20 carbons, eg. as is described for $R^5$ above; however at least one or $R^3$ and $R^4$ contains at least 4 carbons eg. at least 5 carbons, especially in a group with a linear chain containing such numbers of carbon atoms. $R^3$ may preferably be an alkyl group of 10–16 carbons, especially a mixture of 2 or more such alkyl groups. $R^4$ may be hydrogen but is preferably alkyl of 1–10 carbons, eg. methyl or ethyl but especially of 4–6 carbon atoms, such as is described for $R^1$ or $R^2$, Y is an anion e.g. selected from those described for X or Z above. Preferred salts are tetra n-butyl, tetra n-pentyl, tetra-isopentyl ammonium (and phosphonium) halices eg. chlorides or especially bromides, and $C_{10-16}$ alkyl tri n-butyl ammonium (and phosphonium) halides, especially chlorides or bromides. Tri n-butyl, n pentyl or isopentyl sulphonium halides eg. chlorides or bromides may be used.

The Additives (i) and (ii) may be used in weight ratios of 25:0.5–20 e.g. 25:0.75–15 especially 25:1.5–15, 25:3–12 or 25:3–7, while the weight ratio of Additives (i) and (iii) may be 25:3–50 e.g. 25:15–40. When Additives (i), (ii) and (iii) are present, the relative weight ratios may be 25:0.5–20:3–50, such as 25:1.5–15:15–40. The Additives may be used in amounts to provide 1000–4000ppm Additive (i), 50–2000 e.g. 150–2000 ppm and especially 300–700 Additive (ii) and 400–4000 ppm Additive (iii) (based on the total weight of water present in the medium), preferably with total amounts of Additives ((i) and (ii)/(iii) as present) of 1500–8000 e.g. 4000– 7000 ppm (on the same basis).

The Additives (ii) and (iii) may themselves be present in weight ratios of 1–99:99:1 such as 10–90:90:10, but especially with a weight excess of Additive (iii) such as with a ratio of (ii) to (iii) of 10–45:90–55.

The Additives (ii) and (iii) for use as hydrate inhibitors are preferably water soluble, e.g. to at least 10 g/l in water at 20° C. They may be used undiluted, but preferably are in solution such as aqueous solution, for example, as a solution in brine, or preferably an alcohol, for example, a water miscible one such as methanol or ethanol. Preferably are used Additives (ii) and (iii), an aqueous solution of which has a pH 1.5–12, e.g. 4–9, either naturally or after adjustment of the pH. Additives (ii) and/or (iii) may be used in alcoholic solution.

Each Additive is suitably injected at concentrations in the range 10 to 20,000 ppm, e.g. 30 to 10,000 ppm, especially 50–1200 ppm based on the total water volume in the medium, in which hydrate formation is to be inhibited, in particular at concentrations in the range 200–1500 ppm for Additive (ii) and 500–5000 ppm for Additive (iii). The amount of methanol, ethanol, or mono, di or tri ethylene glycol added relative to the total water volume in the medium is usually less than 10%, e.g. less than 5% or 2%, but especially less than 10,000 ppm, eg 1000–8000 ppm.

The inhibitors may be injected at normal ambient conditions of temperature and pressure.

There may also be present with the Additive (i) at least one Additive (ix) which is at least one water soluble polymer of a polar ethylenically unsaturated compound and/or at least one Additive (x) which is a hydrophilic colloid, Additive (ix) being different from Additive (i). The Additive (ix) is usually water soluble to at least 10 g/l at 20° C. and advantageously has a molecular weight of 1000–1500,000, e.g. 5000–1,000,000, preferably 200,000–1,000,000 and especially 400,000–900,000. The ethylenically unsaturated compound is preferably a vinyl or methyl vinyl group, and the polar group may be an alcohol, carboxylic acid, sulphonic acid or N-heterocyclic group, especially pyrrolidone. Preferred polar compounds are thus vinyl sulphonic acid, acrylic and methacrylic acids and N-vinyl pyrrolidone and "vinyl alcohol". The polymers may be copolymers, but are preferably homopolymers of these polar compounds, especially polyvinyl alcohol (e.g. hydrolysed polyvinyl acetate), polyacrylates and polyvinyl pyrrolidone (PYP). The amount of said polymer Additive (ix) is usually 10–1000%, such as 50–300% or 90–250% based on the weight of the total of Additive(s) (i) and (ii).

The hydrophilic colloid (x) is an organic solid which is soluble in boiling water, e.g. to at least 10 g/l or dispersible in boiling water and may be soluble (at least 10 g/l) or dispersible in water at 20° C. It usually absorbs water strongly, e.g. to at least three times such as 3–15 times its weight of water at 20° C., and swells in water. It can form a colloidal solution or dispersion in water and may have an average molecular weight of at least 10,000, e.g. 100, 000–10,000,000. It may be a polysaccharide, e.g. with at least 4 carbohydrate units, especially one with at least some galactose units, e.g. 20–60% of such units, and may contain carboxylic acid residues, so that an aqueous solution or dispersion thereof can have an acidic reaction. The polysaccharide may be a natural gum, e.g. guar, agar, arabic, locust bean, karaya, carob or tragacanth gum, or a cellulosic material, such as starch, which may be unmodified or modified as an alkyl ether, e.g. methyl or ethyl cellulose or hydroxyalkyl ether, e.g. hydroxyethyl cellulose or carboxy alkylated starch, e.g. carboxy methyl cellulose (CMC). The polysaccharide may also be a synthetic, e.g. biosynthetic gum, the result of a microbiological process, e.g. fermentation; xanthan gum, which can be made by fermentation of dextrose with *Xanthomonas campestris* cultures, which is preferred, especially water soluble versions of xanthan gum. The colloid may also be proteinaceous, in particular gelatin or carrageenan (a seaweed extract), e.g. x-carrageenan. The colloid may also be a polyuronic acid or salt thereof, e.g. sodium or ammonium salt or ester thereof, such as a hydroxy alkyl ester (e.g. of propylene glycol), especially with beta-D-mannuronic acid residues; alginic acid and especially sodium alginate is preferred. The amount of Additive (x) may be 10–1000%, eg 50–300% or 90–250% by weight based on the total weight of Additives (i) and (ii).

There may be present the Polymer as Additive (xii) with an aliphatic (N-heterocyclic carbonyl) polymer with a hydrocarbon backbone. It is water soluble or water dispersible, eg to an extent of at least 0.01% by weight in water such as at least 0.05% but especially at least 0.5%, such as up to 10% by weight. Its molecular weight is usually 5000 to 1000000 eg 10000 to 1000000 such as 1000 to 50000 and preferably has a K value of 10–150 especially 15–50, wherein the K value is obtained from the relative viscosity in aqueous solution via the FIKENTSCHER'S Formula, from which the average molecular weight is calculated as described in U.S. Pat. No. 2,811,499. The Polymer has a hydrocarbon chain with pendant N-heterocyclic carbonyl groups, with the bonding to the chain via the heterering -N- atom and the N-heterocyclic carbonyl groups as described further above. The aliphatic group or groups in the polymer may be part of the hydrocarbon chain, or bonded to it or to the N-heterocyclic carbonyl ring; the aliphatic group may be linear or branched and maybe alkyl eg of 1–40 eg 2–25 carbons or alkenyl eg of 2–20 carbons, especially methyl, ethyl, butyl or octyl, tetradecyl, hexadecyl, octadecyl, elcosyl, tricosyl or ethylene, butylene or octylene. The molar ratio of aliphatic group to heterocyclic carbonyl group in the Polymer is usually 1:99 to 20:80 eg 5–15:95–85.

The Polymer may be a copolymer having repeat units derived from at least one monomer which is an optionally alkyl substituted vinyl N-heterocyclic carbonyl compound) and at least one monomer which is an olefin; this copolymer may be simple copolymer formed by copolymerization of the monomers or a graft copolymer formed by grafting the olefin onto a polymer of the N-heterocyclic monomer. The Polymer may also be an alkylated derivative of a polymer of an optionally alkyl substituted (vinyl N-heterocyclic compound) especially a homopolymer of such a compound.

The optionally alkyl substituted vinyl N-heterocyclic carbonyl compound may be of general formula:

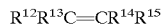

wherein each of $R^{13}$, $R^{14}$ and $R^{15}$, which may be the same or different, represents a hydrogen atom or an alkyl group eg of 1–20 carbons, such as methyl, ethyl, butyl, hexyl, decyl or hexadecyl, and $R^{12}$ represents an N-heterocyclic carbonyl group with the free valency on the N atom, preferably the N heterocyclic carbonyl group is as described above. The N-heterocyclic ring may contain 1–3 ring N atoms but especially 1 ring N atom and 0–2 other ring hetero atoms eg 0 or 5, but especially no ring hetero atom; the ring may contain in total 1 or 2 rings, which may be saturated or ethylenically unsaturated such as a pyrrolidine, piperidine, quinoline or pyridine ring. Preferably $R^{13}$, $R^{14}$ and $R^{15}$ are hydrogen and $R^{12}$ represents an N-(pyrrolidone), N-(2 pyrid-2-one) or N-(piperid-2-one) group.

The olefin is usually of 2–32 eg 4–18 carbon atoms and is generally a hydrocarbon. It is preferably an alkene, especially a linear alkene and has in particular a terminal olefin group. It is preferably a vinyl olefin eg of formula $CH_2=CH—R^{16}$, where $R^{16}$ is hydrogen or alkyl of 1–40 carbons, such as methyl, ethyl, propyl, butyl, hexyl or decyl, tetra decyl, octadecyl or octacosyl (so the olefin is tricosene). The olefin is preferably butylene octene-1 or dodecene-1, hexa decene- 1, octadecene-1, eicosene-1 or tricosene-1.

The Polymer may be made by free radical copolymerizing the N-heterocyclic carbonyl compound eg N-vinyl pyrrolidone with the olefin eg butylene in solution in the presence of a peroxide catalyst. The Polymer may also be made by free radical grafting of the olefin onto a polymer of the N-heterocyclic carbonyl compound eg poly vinyl pyrrolidone (PVP) with K value as described above. The copolymerizations may incorporate structural units from the olefin into the hydrocarbon polymer chain and/or insert such units into the N-heterocyclic rings.

The Polymer may also be made by direct alkylation of the polymer of the N-heterocyclic carbonyl compound eg PVP with an alkylating agent eg an alkyl halide such as butyl bromide or octyl bromide, optionally in the presence of a base, such as triethyl amine.

Finally the Polymer may be a homo or copolymer of an alkyl substituted N-(alkenyl) heterocyclic compound in which the alkyl substituent may be in the N-heteroring and/or present in the alkenyl side chain; the alkyl substituent may be as is preferred for the aliphatic group on the Polymer described above. The Polymer may have structural units from an N-vinyl-alkyl ring substituted heterocyclic carbonyl compound, such as N-vinyl-3-methyl pyrrolid-2-one and/or from an N-butenyl-heterocycle carbonyl compound, such as N-butenyl-pyrrolid-2-one. Such Polymers may be made by polymerization in solution in the presence of a free radical catalyst, in an analoguous way to polyvinyl pyrrolidine.

Thus the preferred Polymers are aliphatic (N-heterocyclic carbonyl) polymers with units derived from N-vinyl pyrrolid-2-one and butylene (sold as Antaron P 904), octylene, dodecylene, hexadecylene (sold as Antaron V216), eicosylene and tricosylene; the Antaron products are sold by International Speciality Products of Wayne, N.J., USA. Polymer xii may be as described in WO 93/25798 the disclosure of which is herein incorporated by reference.

The Polymer may also be as Additive (xiii) a copolymer of (a) at least 1 ethylenically unsaturated N- heterocyclic ring compounds especially with at least one of (b) a different ethylenically unsaturated N-heterocyclic ring compound, (c) an ethylenically unsaturated carbocyclic carbonyl compound, and (d) a polar ethylenically unsaturated compound, different from said N-heterocyclic compounds, said copolymer being different from Additive (i). Polymer Additive xiii preferably consists essentially of structural units derived from at least 2 of said (a)–(d) compounds, in particular (a), (b) and (d). Polymers (xiii) from heteroring ring compounds with different size rings e.g. with differences of 1–3 in the numbers of ring atoms are preferred, especially ones with 5 and 7 membered heterorings. Examples of the ethylenically unsaturated N-heterocyclic ring compounds are ones described above in relation to Polymers (i) and (ix) especially N-vinyl-pyrrolidone and N-vinyl omega caprolactam. The carbocyclic compound may be one with 4–8 eg. 6 or 7 ring atoms with the carbonyl group in the ring preferably adjacent to a carbon atom carrying the ethylenically unsaturated group which is preferably an alkenyl group of 2–6 carbon atoms especially with a terminal $CH_2=CH$-group. The carbocyclic compounds are cyclic ketones with an unsaturated side chain. Examples of the carbocyclic compound are 2-vinyl- cyclohexanone and 2-vinyl-cycloheptanone. The polar ethylenically unsaturated compound may be an ester of an alcohol containing more than 1 polar group and an unsaturated acid. The alcohol usually contains a hydroxyl group and at least one other hydroxyl group or aminogroup, which may be a primary secondary or especially tertiary amino group in particular in a non cyclic arrangement, thus the alcohol may be a diol or an amino alcohol, especially an aliphatic one, such as a dialkylaminoalkanol, with 1–4 carbons in each alkyl and 2–4 carbons in the alkanol. 2-Dimethylamino ethanol is preferred. The unsaturated acid is usually an aliphatic alkenoic acid with 3–1 0 carbons such as acrylic or methacrylic or crotonic acid. This unsaturated ester is especially a (meth) acrylate ester of a dialkylamino alkanol in particular dimethylaminoethyl acrylate or methacrylate. Polymer Additive xiii may be as described in WO94/12761, the disclosure of which is herein incorporated by reference.

The Polymer xiii may contain structural units in molar % derived from 10–90% of the N-heterocyclic compound, 10–90% of the carbocyclic compound and 10–90% of the polar ethylenically unsaturated compound. A preferred compound is a copolymer of N-vinyl pyrolidone, N-vinyl-omega caprolactam and dimethylamino ethyl methacrylate, such as is sold as Antaron VC713 by International Speciality Products of Wayne, N.J.

The amount of said Polymer (xiii) is usually 10–1000% such as 50–300% or 90–250% based on the weight of the total of Additives (i) and (ii). Mixtures of the aliphatic (N-heterocyclic carbonyl) polymer (xii) and the copolymer (xiii) may be used especially in weight ratios of 10–90:90–10 in particular a majority of(xiii) eg. in weight ratio of (xii) to (xiii) of 10–40:90–60.

Preferably at least one and preferably all of Additives ix, xii and xiii, and possible x are substantially absent from the blends and methods of the invention.

The Formulations preferably contain at least one anti-foaming agent (xiv) especially when the Additive (ii) or (iii) has foaming activity, eg. when either contains at least one alkyl group of at least 8 carbon atoms. Examples of suitable anti-foaming agents are silicon containing compounds especially organosilicon oxygen or nitrogen compounds, such as polysiloxanes, including cyclic polysiloxanes, silicon polyethers, polysilazanes and fluorosiloxanes. Alkylpolysiloxanes are preferred especially dimethyl polysiloxanes such as 3556 from Th. Goldschmidt KG and AF 1520 from Dow Corning. The silicon anti-foaming agents are usually used as water dispersible emulsions. Silicon free anti-foaming agents, such as suds depressants used in detergents, may also be used. The amount of the anti-foaming agent is usually 10–70 ppm e.g. about 40 ppm (based on the total water present), or 0.1–5% e.g. 0.5–3% (based on the total weight of Additives (ii) and (iii)).

Formulations comprising Additive (i), (ii) and/or (iii) and optionally at least one of Additive (ix), (x), (xii) and (xiii) may be used in total amount of 50–10,000 ppm. especially 150–2000 ppm, or 2000–8000 such as 4000–6000 ppm relative to the total water in the medium in which hydrates may form (including any water added in the formulation).

The Formulation may also contain another hydrate inhibitor and/or a water dispersant or surfactant, in particular an anionic one such as sodium dodecyl sulphonate or stearic acid and in amount of 1–10% of the Formulation weight and/or a biocide, e.g. formaldehyde, e.g. in amount of 10–10,000 ppm and/or a metal complexant such as citric acid (e.g. in amount of 10–10,000 ppm) all amounts being in relation to the total weight of the Formulation.

The Formulations may be used to retard or inhibit hydrate formation and may also reduce the rate of crystal growth of gas hydrates.

The inhibitor Formulations of the present invention are suitable for use in media containing water and gas, in particular in the petroleum, natural gas and gas industries. The gas may be a hydrocarbon normally gaseous at 25° C. and 100 KPa pressure, such as an alkane of 1–4 carbon atoms eg methane, ethane, propane n or isobutane, or an alkane of 2–4 carbon atoms eg ethylene, propylene, n- or isobutene; the gas preferably comprises by weight (or especially by moles) at least 80% and especially at least 90% of methane with 0.1–10% eg 1–5% $C_2$ hydrocarbon and/or 0.01–10% eg 0.05–5% $C_3$ hydrocarbon. A natural gas, which may or may not have been purified or processed is preferred. The gas may also contain nitrogen eg in amount of 0.01–3% by weight and/or carbon dioxide eg in amount of 0.1–5% such as 0.5–2% by weight. The formulations of the invention are particularly suitable for treating wet gases, whose composition (on a dry basis) comprises (by moles) 80–90% methane, 3–8% ethane, 1–5% propane and 0.5–3% $C_4$ and $C_5$ hydrocarbons, as well as 1–5% carbon dioxide and 0.1–1.5% nitrogen, these gases being particularly prone to producing gas hydrates. The Additive (i) and (ii)/(iii) can be more effective than poly vinyl pyrrolidone in the inhibition of gas hydrate formation, especially when the gas comprises carbon dioxide.

In particular, they may be suitable for use during the transportation of fluids comprising gas and water eg from oil or gas wells. They may also be suitable for use in oil based drilling muds to inhibit hydrate formation during drilling operations.

In another aspect therefore the invention provides an oil based drilling mud, which comprises as hydrate inhibitor at least one blend or Formulation of the invention.

When used during the transportation of fluids, e.g. gases with water and optionally oil eg. condensate in conduits such as pipelines the inhibitors may be injected continuously or batchwise into the conduit upstream of conditions wherein hydrate formation may occur. Conditions under which gas hydrates may form are usually at greater than −5° C. eg greater than 0° C. such as 0 to 1 5° C. eg 1–10° C. and pressures eg of 0.1–30 MPa eg 1–15 MPa the temperature of onset of gas hydrate formation depending on the pressure, and the presence of, and concentration of, salt in the water. As the temperature decreases and the pressure increases and the concentration of salt decreases the greater is the likelihood for hydrate formation to happen in the absence of the Additives and Formulations of the invention. Thus the conditions of use of the Formulations are ones such that in their absence a gas hydrate may form, or crystals of gas hydrate may grow In the absence of the Formulations ice may also form in addition to the gas hydrate especially at temperatures of −5° C. to 5° C. The pH of the water eg in the pipeline after addition of the Formulation is usually 3–9, especially 3.3–5 or 5–7.5.

In drilling operations the inhibitors may be added to the drilling muds in the mud tank at the wellhead.

The invention is illustrated in the following Examples.

EXAMPLES

To assess the efficiency of hydrate inhibitors suitable for use in the method of the present invention, tests were carried out using the following procedure:

The hydrate inhibitor test apparatus consisted of a simple 316 stainless steel pressure cell, with a usable internal volume of 1000 $cm^3$ with a thermostated cooling jacket, a sapphire window, an inlet and outlet and a platinum resistance thermometer. The cell contained water which was stirred by a magnetic pellet. Temperature and pressure were monitored and the results provided on a computer data logger; gas hydrates were also detected visibly using a time lapse video recording system. Before each test the cell was cleaned thoroughly by soaking successively in 10% aqueous hydrochloric acid for 1 hour, 10% aqueous sodium hydroxide solution for 1 hour and then double distilled water.

Into the cell was placed 200 $cm^3$ of pre-chilled double distilled water with or without the chemical to be tested. A PTFE stirrer pellet was then placed in the cell and the pH of the solution measured with subsequent adjustment if desired by the addition of small but concentrated amounts of hydrochloric acid or sodium hydroxide. After sealing the cell the water was then stirred at 500 rpm and allowed to cool to the operational temperature of 4° C. When this temperature was reached the stirrer was stopped and the video recorder started. A gas mixture of 2% propane and 98% methane (by moles) was then admitted to the cell until the pressure reached 70 bar (7 MPa) and the temperature, pressure and time were noted. The stirrer was restarted to run at 500 rpm and the time noted. Hydrates were observed to form in the vessel when the solution in the vessel turned opaque, coincident with which was a sharp temperature increase of about 0.2° C. and a gradual pressure reduction. The time from first contact of water and gas to formation of hydrate was read from the logger.

The experimental conditions are very severe and accelerated test of gas hydrate formation and inhibition. The amounts of the Additive are expressed in ppm based on the volume of water. The inhibition time results given are an average of several results.

In the Examples, the following Additives were used

Additive (i)(a) was homopolymeric N-vinylomega caprolactam,

Additive (i)(b) was a copolymer with structural units from N-vinyl caprolactam and N-vinyl pyrrolidone in 75:25 molar ratio, Additive (i)(c) was a copolymer with structural units from N-vinyl omega caprolactam and N-vinyl pyrrolidone in a 50:50 molar ratio.

Additives (i)(a)-(c) were water soluble polymers obtained as about 52% solutions in methanol from International Speciality Products of Wayne N.J., USA under the Trade Marks ACP 1177, 1160 and 1161 respectively, and with weight average molecular weights of about 75000, 128000 and 206000.

Additive (ii)(a) was Benzalkonium chloride, which was a mixture of benzylalkyldimethyl ammonium chlorides from Fluka believed to have 8–18C alkyls.

Additive (ii)(b) was a corrosion inhibitor, sold by BP Chemicals under the Trade Mark C 795, which was a mixture of phosphate ester salt, and an inorganic salt in water with butyl diglycol ether.

Additive (ii)(c) was a corrosion inhibitor (sold under the Trade Mark "Champion" RU189 by Champion Technologies Inc., Tex., USA), which is believed to be a 1:1 mixture of quaternary ammonium salt and an aliphatic imidazoline.

Additive (iii) was tetra-n-pentylammonium bromide.

Additive (xiv) was an anti-foaming agent, which was a polydimethylsiloxane sold by Dow Corning under the Trade Mark AF1520.

Examples 1–8

The formulations were made up and added to the water so it contained the Additives below in amounts (in ppm relating to total water present). The results (averaged over several repeat experiments) were as follows

| | Additive, Amount (ppm) | | | | | | |
|---|---|---|---|---|---|---|---|
| EXP. | (i) | (ii) | (iii) | (xiv) | Total | pH | Inhibition Time/Mins |
| 0 | — | — | — | — | — | — | 6 |
| 1 | (a)2500 | (a)1000 | 2500 | — | 6000 | 5.6 | 1650 |
| 2 | (a)2500 | (a)500 | 2500 | 40 | 5540 | 4.8 | 1990 |
| 3 | (a)2500 | (b)500 | 2500 | 40 | 5540 | 6.5 | 198 |
| 4 | (a)2500 | (c)400 | 2500 | 40 | 6040 | 6.4 | 367 |
| 5 | (a)2500 | (c)200 | 2500 | 40 | 5240 | — | 194 |
| 6 | (a)2500 | | 2500 | | 5000 | 5.5 | 1120 |
| 7 | (b)2500 | | 2500 | | 5000 | — | 508 |
| 8 | (c)2500 | | 2500 | | 5000 | 5.1 | 152 |

The weights of Additive (i) are expressed as weights of polymer, not weights of polymer solution.

EXAMPLE 9

The process of Ex. 1 was repeated at 5° C. with a North Sea gas mixture comprising (on a dry basis by mol %) nitrogen 0.81%, carbon dioxide 3.36% methane 84.4%, ethane 6.79%, propane 2.54%, isobutane 0.43%, n butane 0.77%. iso pentane 0.245%, and n pentane 0.246% and the remainder higher hydrocarbons. In addition there was present in the cell crude oil from a gas field from where the gas mixture came; in the cell there were equal weights of water and oil. The process was also repeated with no Additive. The time to hydrate formation was 0.5 min. for the latter and an average of 20 hr 41 mins. (1241 min.) when the Additives were present.

What is claimed is:

1. A blend comprising an additive (i) and an additive (iii) a salt of formula $[R^1(R^2)XR^3]^+Y^-$ 1/v,l wherein each of $R^1$, $R^2$ and $R^3$ is bonded directly to X, each of $R^1$ and $R^2$, which may be the same or different is an alkyl group of at least 4 carbons, X is S, $NR^4$ or $PR^4$, wherein each of $R^3$ and $R^4$ which may be the same or different represents hydrogen or an organic group, with the proviso that at least one of $R^3$ and $R^4$ is an organic group of at least 4 carbons, and Y is an anion of valency v, wherein v is an integer of 1–4, wherein additive (i) is a polymer consisting essentially of structural units derived from an ethylenically unsaturated N-heterocyclic carbonyl compound with 6–8 ring atoms in the heterocyclic ring.

2. A blend according to claim 1 in which additive (i) is a homopolymeric N-vinyl-omega caprolactam.

3. A blend according to claim 1 further comprising an additive (ii) a corrosion inhibitor.

4. A blend according to claim 3 in which additive (ii) is at least one of a primary, secondary or tertiary amine, a quaternary ammonium salt which differs from additive (iii) a long chain aliphatic hydrocarbyl N-heterocyclic compound, a long chain amine or a blend of a phosphate ester salt and an inorganic salt.

5. A blend according to claim 1 in which additive (iii) is a tetra-n-butyl, tetra-n-pentyl, tetra-iso-pentyl ammonium or phosphonium halide.

6. A blend according to claim 5 in which additive (iii) is tetra-n-pentyl ammonium bromide.

7. A blend according to claim 1 which also comprises at least one of additive (ix) which is a water soluble polymer of a polar ethylenically unsaturated compound, additive (x) which is a hydrophilic colloid, additive (xii) which is an aliphatic (N-heterocyclic carbonyl) polymer with a hydrocarbon backbone, additive (xiii) which is a copolymer of (a) at least one ethylenically unsaturated N-heterocyclic ring compound with at least one of (b) a different ethylenically unsaturated N-heterocyclic ring compound and (c) a polar ethylenically aliphatic unsaturated compound, different from said N-heterocyclic compounds, said polymer (xiii) being different from additive (i), and additive (xiv) which is an anti-foaming agent.

8. A blend according to claim 1 in which additive (i) is water soluble.

9. A blend according to claim 3 in which the relative weight ratio of additive (i): (ii): (iii) is 25:0.5–20:3–50.

10. A method of retarding or inhibiting hydrate formation which method comprises adding a blend as claimed in claim 1 to a medium susceptible to hydrate formation.

11. A method according to claim 10 wherein the total additive concentration is 50–10,000 ppm relative to the total water in the medium.

12. A method according to claim 10 wherein the medium is in the presence of water and a gas which comprises methane and at least one of 0.1–10% C2 hydrocarbon and 0.1–10% C3 hydrocarbon and 0.1–5% carbon dioxide, all by weight.

13. An oil-based drilling mud comprising a blend as claimed in claim 1.

14. A blend according to claim 4 in which additive (i) is a homopolymeric N-vinylomega caprolactam and additive (iii) is tetra-n-pentyl ammonium bromide or tetra-n-butyl ammonium bromide.

15. A method of retarding or inhibiting hydrate formation which method comprises adding a blend as claimed in claim 3 to a medium susceptible to hydrate formation.

16. An oil-based drilling mud comprising a blend as claimed in claim 3.

* * * * *